(12) United States Patent
Pan (10) Patent No.: US 9,441,671 B2
(45) Date of Patent: Sep. 13, 2016

(54) BEARING WITH K-TYPE CAGE

(71) Applicant: Schaeffler Technologies AG & Co. KG, Herzogenaurach (DE)

(72) Inventor: Renhui Pan, Suzhou (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/745,603

(22) Filed: Jun. 22, 2015

(65) Prior Publication Data

US 2015/0377290 A1    Dec. 31, 2015

(30) Foreign Application Priority Data

Jun. 25, 2014    (CN) .......................... 2014 1 0289688

(51) Int. Cl.
*F16C 33/50* (2006.01)
*F16C 33/46* (2006.01)
*F16C 19/46* (2006.01)

(52) U.S. Cl.
CPC ....... *F16C 33/4694* (2013.01); *F16C 33/4623* (2013.01); *F16C 33/4635* (2013.01); *F16C 19/463* (2013.01)

(58) Field of Classification Search
CPC ............................ F16C 33/502; F16C 33/504
USPC ......................................... 384/573, 578, 579
See application file for complete search history.

(56) References Cited

U.S. PATENT DOCUMENTS 4,239,304 A * 12/1980 Wakunami ............ F16C 33/504
384/573

8,840,315 B2 * 9/2014 Stork ........................ B25B 7/00
384/573
2002/0081053 A1 * 6/2002 van der Knokke ..... F16C 33/41
384/577

FOREIGN PATENT DOCUMENTS

DE         19856024 A1 *  6/2000  .......... F16C 33/4635
JP          4748145 B2 *  8/2011  ............ F16C 33/504
SE   DE 102011005407     *  9/2012  .......... F16C 33/4635

* cited by examiner

*Primary Examiner* — Phillip A Johnson
(74) *Attorney, Agent, or Firm* — Volpe and Koenig, P.C.

(57) ABSTRACT

A K-type cage bearing having two coaxial lateral rings; and a plurality of transverse bars set between the rings and spaced along the circumferential direction, two ends of each transverse bar are respectively connected with the two lateral rings, and two of the bars located adjacent to the opening of the cage are respectively defined as first and second transverse bars. Both the first and second transverse bars are configured with at least one connection element, all the connection elements extend into the opening of the cage, and the connection element on the first transverse bar faces the connection element on the second transverse bar in a one to one manner along the circumferential direction of the cage; one is configured with an inserting block, while the other has a groove. The inserting block is insertable into the groove; and the groove includes first and second side surfaces, the first side surface faces to the transverse bar where the groove is located along the circumferential direction of the cage and is adapted to limit the inserting block from moving along the circumferential direction. The second side surface faces to one of the two lateral rings along an axial direction and limits the inserting block axially so the cage does not tend to loosen at the engaging position of the connection elements.

9 Claims, 4 Drawing Sheets

BEARING WITH K-TYPE CAGE

INCORPORATION BY REFERENCE

The following documents are incorporated herein by reference as if fully set forth: Chinese Patent Application No. 201410289688.X, filed Jun. 25, 2014.

TECHNICAL FIELD

The present invention generally relates to the technology field of bearing, and more particularly, to a bearing with a K-type cage.

BACKGROUND

According to existing technologies, a K-type cage bearing includes a cage and rolling elements located in the cage, which is mainly applied to gearboxes and automobile transmissions. The K-type cage bearing is usually mounted to a rod shaped element and encircled by a circular element. The inner circumferential surface of the circular element servers as one roller path of the rolling elements, and the outer circumferential surface of the rod shaped element encircled by the K-type cage bearing servers as another roller path of the rolling elements. The cage of existing K-type cage bearings has an opening along the circumferential direction. Before the bearing is mounted to the rod shaped element, the opening of the cage is kept to be open, thus the K-type cage bearing can be mounted to the rod shaped element along a radial direction of the rod shaped element. Thereafter, components disposed on two sides of the opening are engaged with each other.

Figure 1:
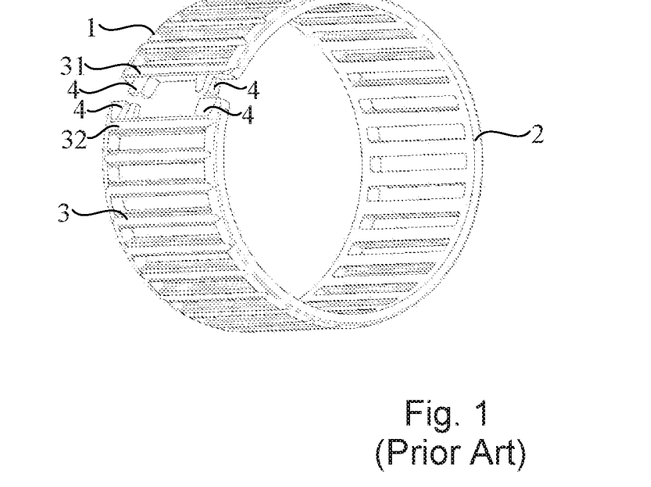
FIG. 1 schematically illustrates a perspective structure diagram of a cage for an existing K-type cage bearing.
Figure 2:
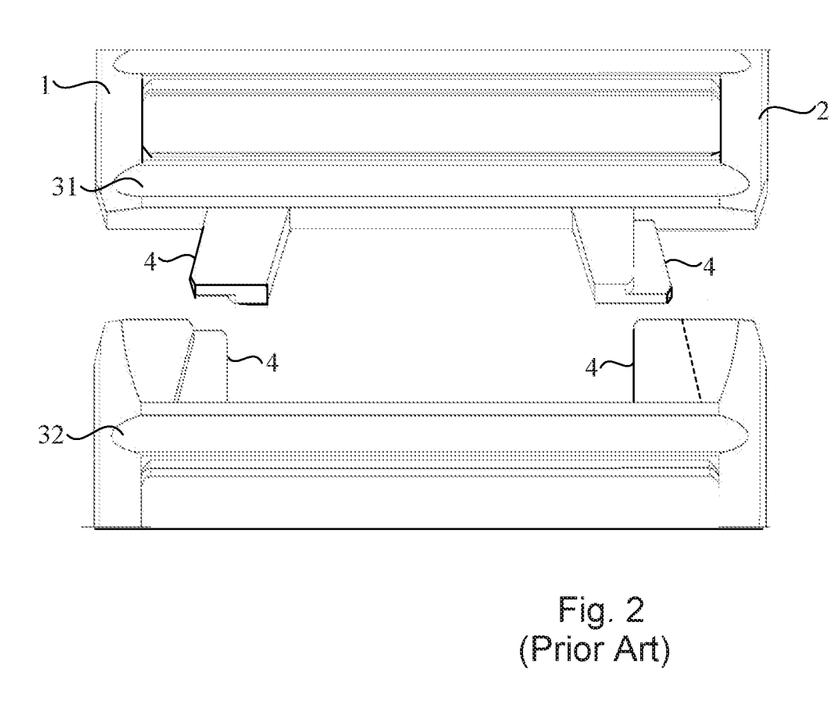
FIG. 2 schematically illustrates a perspective structure diagram of a partial of the cage in FIG. 1.

Referring to FIG. 1 and FIG. 2, an existing K-type cage bearing is illustrated. The bearing has a cage which is mainly constituted by two co-axial lateral rings 1 and 2. A plurality of transverse bars 3 are set to connect the two lateral rings and spaced arranged along a circumferential direction of the cage. Among the plurality of traverse bars 3, those two located adjacent to the opening of the cage are respectively defined as a first transverse bar 31 and a second transverse bar 32.

Figures 3, 4:
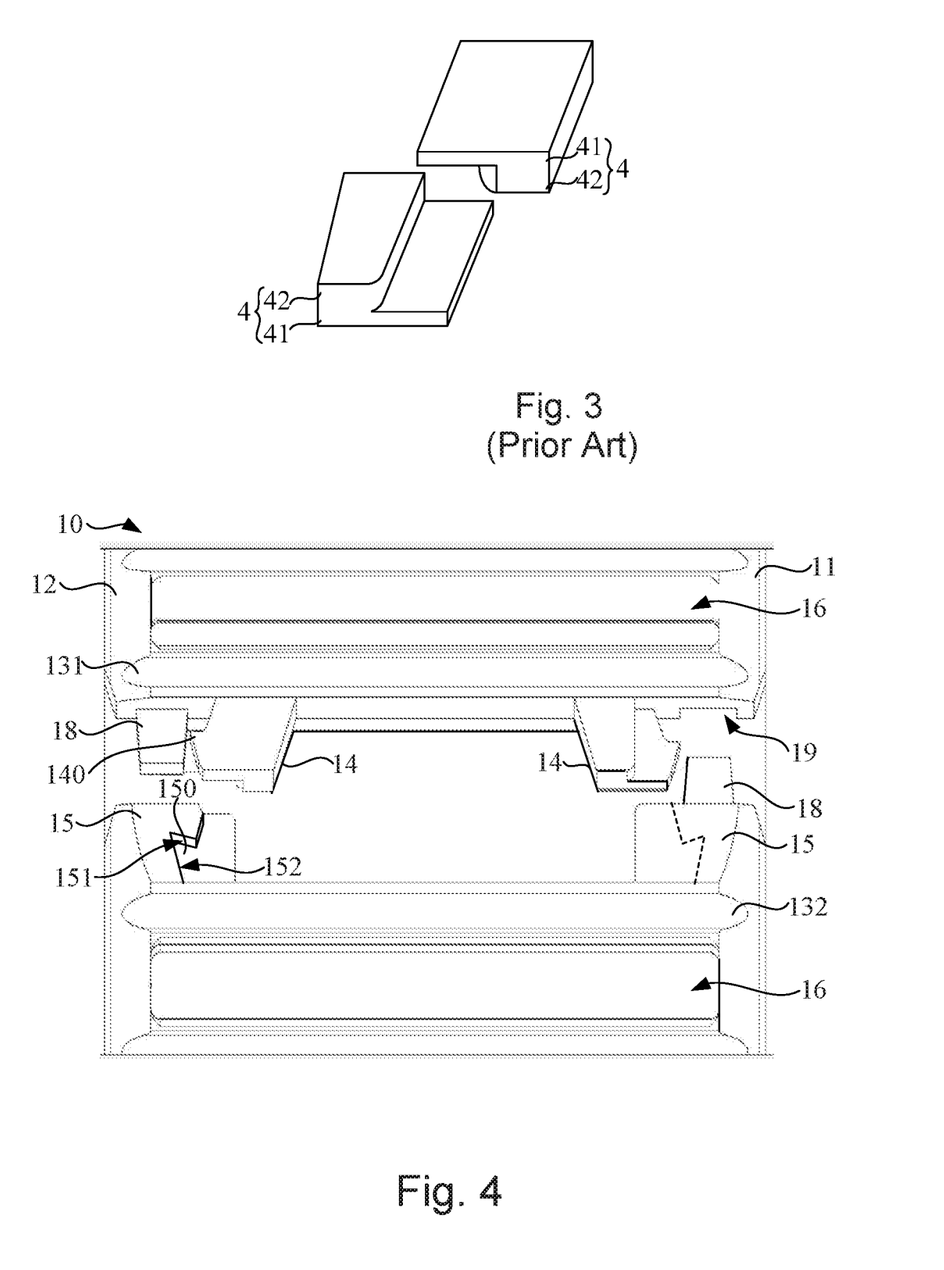
FIG. 3 schematically illustrates two connection elements of an exiting K-type cage bearing which are set face to face along a circumferential direction, wherein the two connection elements are disengaged.
FIG. 4 schematically illustrates a perspective structure diagram of a partial of a cage for a K-type cage bearing according to one embodiment of the present disclosure.

The first transverse bar 31 is configured with two connection elements 4, and the second transverse bar 32 is also configured with two connection elements 4. The two connection elements 4 set on one common transverse bar are spaced and arranged along an axial direction of the cage. The two connection elements 4 on the first transverse bar 31 are adapted to match with the two connection elements 4 on the second transverse bar 32, respectively. Specifically, along the circumferential direction, a first connection element on the first transverse bar 31 faces to a first connection element on the second transverse bar 32; while a second connection element on the first transverse bar 31 faces to a second connection element on the second transverse bar 32. In other words, along the circumferential direction of the cage, the connection elements 4 on the first transverse bar 31 face to the connection elements 4 on the second transverse bar 32 in one to one manner. Referring to FIG. 3, each of the connection elements 4 includes: a plate-shaped body 41 having two plate surfaces facing to opposite directions along a radial direction of the cage; and a protruding part 42 located on one of the two plate surfaces of the plate-shaped body 41. Regarding two of the connection elements 4 which face to each other along the circumferential direction, the protruding part 42 of one connection element is set at the plate surface of the plate-shaped body 41 facing the inner side of the cage, and the protruding part 42 of the other connection element is set at the plate surface of the plate-shaped body 41 facing the outer side of the cage. Furthermore, the plate surfaces of these two connection elements 4 where the protruding parts 42 are located fit neatly with each other along the radial direction of the cage, and the two protruding parts 42 stand against each other along the axial direction, so as to close the opening of the cage. As such, the two connection elements 4, which are configured to face to each other along the circumferential direction, are adapted to limit each other from moving along the radial direction via the two plate-shaped bodies 41, and adapted to limit each other from moving along the axial direction via the two protruding parts 42. The broken line in FIG. 2 indicates the position of the protruding part which is sheltered by the plate-shaped body and thus can not be seen in FIG. 2.

However, existing cage bearings are unable to achieve pre-tightness along the circumferential direction. Specifically, regarding the two connection elements 4 which face to each other along the circumferential direction, their movements along the circumferential direction can not be limited. Thus, when the K-type cage bearing works and vibrates, the cage may get loose or even break along the circumferential direction at the joint of the connection elements, which will affect the normal working of the machine using the cage bearing.

SUMMARY

Problem solved by the present disclosure is that, pre-tightness of cage along the circumferential direction can not be achieved by existing cage bearings. When the K-type cage bearing works and vibrates, the cage may get loose or even break along the circumferential direction at the joint of the connection elements, which will affect the normal working of the machine using the cage bearing.

In order to solve above recited problem, the present disclosure provides a K-type cage bearing. The K-type cage bearing includes a cage which has an opening along a circumferential direction thereof, wherein the cage includes: two coaxial lateral rings; and a plurality of transverse bars set between the two lateral rings and spaced along the circumferential direction, wherein two ends of each transverse bar are respectively connected with the two lateral rings, and among the plurality of transverse bars, those two located adjacent to the opening of the cage are respectively defined as a first transverse bar and a second transverse bar; wherein both the first transverse bar and the second transverse bar are configured with at least one connection element, all the connection elements extend from the first or second transverse bar into the opening of the cage, and the at least one connection element on the first transverse bar faces to the at least one connection element on the second transverse bar in one to one manner; wherein between two of the connection elements facing to each other along the circumferential direction, one connection element is configured with an inserting block, while the other connection element is configured with a groove, and the inserting block is adapted to be inserted into the groove; and wherein the groove includes a first side surface and a second side surface, the first side surface faces the transverse bar where the groove is located along the circumferential direction of the cage and is adapted to limit the inserting block from moving along the circumferential direction, and the second side surface faces one of the two lateral rings along an axial direction of the cage and is adapted to limit the inserting block from moving along the axial direction.

Optionally, both the first transverse bar and the second transverse bar are configured with two connection elements, among which two connection elements are configured with the groove, the second surface of the groove of one connection element and the second surface of the groove of the other connection element are configured to face to the two lateral rings, respectively.

Optionally, projections of the first side surface and the second side surface on a plane perpendicular to a central axis of the cage are partially overlapped.

Optionally, the groove further includes a first surface which is parallel to a central axis of the cage and is adapted to limit the inserting block from moving along a radial direction.

Optionally, between two connection elements which are configured with the groove, the first surface of the groove of one connection element and the first surface of the groove of the other connection element are configured to face to opposite directions, respectively.

Optionally, the connection element which is configured with the inserting block is defined as a first connection element, and the connection element which is configured with the groove is defined as a second connection element; the first connection element includes a first plate-shaped body, the first plate-shaped body has two first plate surfaces facing to opposite directions along the radial direction of the cage and two third side surfaces facing to opposite directions along the axial direction of the cage; the second connection element includes a second plate-shaped body, the second plate-shaped body has two second plate surfaces facing to opposite directions along the radial direction of the cage and two fourth side surface facing to opposite directions along the axial direction of the cage; and the inserting block is located on one of the third side surfaces and protrudes along the axial direction of the cage, the groove is located in one of the second plate surfaces and has an opening extending to one of the fourth side surfaces along the axial direction of the cage, the third side surface where the inserting block is located and the opening of the groove extending along the axial direction respectively face to the two lateral rings; or the inserting block is located on one of the first plate surfaces and protrudes along the radial direction of the cage, the groove is located in one of the second plate surfaces, and between the first plate surface where the inserting block is located and the second plate surface where the groove is located, one is configured facing to an inner side of the cage along the radial direction, and the other one is configured facing to an outer side of the cage along the radial direction.

Optionally, the inserting block is located on one of the third side surfaces and the groove is located in one of the second plate surfaces; the first connection element further includes a protruding part located on one of the first plate surfaces; on a side where the opening of the groove extending along the axial direction is located, the second connection element further includes an extended plate, the extended plate has two third plate surfaces facing to opposite directions along the radial direction of the cage, one of the third plate surfaces and the first surface are configured on a common plane; between two connection elements facing to each other along the circumferential direction, the first plate surface where the protruding part of the first connection element is located and the first surface of the groove of the second connection element face to two opposite directions respectively, when the inserting block is inserted into the groove, the extended plate stands against the protruding part along the axial direction of the cage.

Optionally, the inserting block is located at one of the first plate surfaces, and the groove is located in one of the second plate surfaces; and the groove further has a fifth side surface facing to the second side surface along the axial direction.

Optionally, the first transverse bar is configured with inserting elements at two ends thereof, and the second transverse bar is configured with inserting grooves at two ends thereof; or the first transverse bar is configured with an inserting element and an inserting groove at two ends respectively, and the second transverse bar is configured with the inserting element and the inserting groove at two ends thereof respectively; the inserting elements face to the inserting grooves in one to one manner; the inserting elements extends into the opening of the cage; and the inserting groove has two side walls facing to each other along the axial direction of the cage, a bottom surface facing the inner side of the cage along the radial direction of the cage, and an opening facing the inserting element along the circumferential direction of the cage, wherein the inserting element is adapted to be inserted into the inserting groove through the opening of the inserting groove.

In comparison with existing technologies, the technical solutions provided by the present disclosure have following advantages.

When the inserting block is inserted into the groove, the first side surface of the groove is adapted to limit the inserting block from moving along the circumferential direction. Thus, when the K-type cage bearing works and vibrates, the cage does not tend to get loose at the joint position of the connection elements along the circumferential direction, so as to keep the machined installed with the K-type cage bearing working normally.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 5:
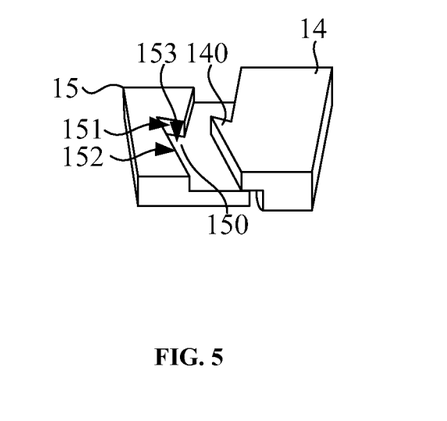
FIG. 5 schematically illustrates two connection elements of a K-type cage bearing which are set face to face along a circumferential direction, wherein the two connection elements are disengaged.

A K-type cage bearing includes a cage and rolling elements located in the cage. Referring to FIG. 4, a cage 10 for the K-type cage bearing according to one embodiment is illustrated, the cage 10 has an opening along a circumferential direction thereof. The cage 10 includes: two coaxial lateral rings 11 and 12; a plurality of transverse bars set between the two lateral rings 11 and 12, and spaced arranged along the circumferential direction, wherein two ends of each of the plurality of transverse bars are respectively connected with the two lateral rings 11 and 12. Among the plurality of transverse bars, those two located adjacent to the opening of the cage 10 are respectively defined as a first transverse bar 131 and a second transverse bar 132. The first transverse bar 131 is configured with two connection elements spaced arranged along an axial direction of the cage 10. These two connection elements on the first transverse bar 131 are both configured with an inserting block 140. The connection element configured with the inserting block 140 is defined as a first connection element 14. The second transverse bar 132 is also configured with two connection elements spaced arranged along the axial direction of the cage 10. These two connection elements on the second transverse bar 132 are both configured with a groove 150. The connection element configured with the groove 150 is defined as a second connection element 15. All the first connection elements 14 and the second connection elements 15 extend from the first transverse bar 131 or the second transverse bar 132 into the opening of the cage 10. And, the two first connection elements 14 are adapted to respectively match with the two second connection elements 15. Specifically, along the circumference direction of the cage, one of the first connection elements 14 faces to one of the second connection elements 15, while the other one of the first connections 14 faces to the other one of the second connection elements 15. In other words, the two first connection elements 14 face to the two second connection elements 15 in one to one manner along the circumference direction of the cage. Referring to FIG. 5, regarding the first connection element 14 and the second connection element 15 which face to each other along the circumferential direction of the cage, the inserting block 140 of the first connection element 14 can be inserted into the groove 150 of the second connection element 15, thus the first connection element 14 and the second connection element 15 can be connected with each other. The groove 150 includes a first side surface 151 and a second side surface 152. Along the circumferential direction of the cage, the first side surface 151 faces to the second transverse bar 132 where the groove 150 is located. The first side surface 151 is adapted to limit the inserting block 140 from moving along the circumferential direction of the cage. Along the axial direction of the cage, the second side surface 152 faces to one of the lateral rings. The second side surface 152 is adapted to limit the inserting block 140 from moving along the axial direction of the cage. In FIG. 4, the dashed line box indicates the position of the groove which faces to an inner side of the cage along a radial direction of the cage thus can not be seen in FIG. 4.

The cage 10 has a pocket 16 located between two neighboring transverse bars. When the cage according to this embodiment is in use: firstly, filling the pockets with rolling elements; secondly, opening the opening of the cage and mounting the cage on a shaft along the radial direction; thereafter, inserting the inserting block 140 into the groove 150, so as to close the cage along the circumferential direction. When the K-type cage bearing works, the first side surface 151 is adapted to confine the inserting block 140 in the groove 150, so as to prevent the first connection element 14 and the second connection element 15 which are already engaged from departing from each other. Therefore, the cage can be pre-tightened along the circumferential direction, and the first connection element 14 and the second connection element 15 which face to each other along the circumferential direction can be prevent from getting loose at the joint position, thus the machine equipped with the K-type cage bearing can work normally.

In this embodiment, the first transverse bar 131 and the second transverse bar 132 are both configured with two connection elements, but the present disclosure is not limited to this. In some other embodiments, the first transverse bar may be configured with one or more than two connection elements, and the second transverse bar may be also configured with one or more than to connection elements, wherein the one or more than two connection elements on the first transverse bar face to the one or more than two connection elements on the second transverse bar in one to one manner along the circumferential direction. Furthermore, in this embodiment, the connection elements configured with the inserting block are set on one common transverse bar, and the connection elements configured with the groove are set on another common transverse bar. In some embodiments, when the first transverse bar and the second transverse bar are both configured with at least two connection elements, regarding all the connection elements on the first transverse bar, at least one connection element is configured with the inserting block, and the other at least one connection element is configured with the groove; and configurations of the connection elements on the second transverse bar are the same. Further, along the circumferential direction, the connection elements configured with the inserting block face to the connection elements configured with the groove in one to one manner.

Referring to FIG. 4 and FIG. 5, when the inserting block 140 is inserted into the groove 150, the inserting block 140 and the second side surface 152 stand against each other along the axial direction, so as to prevent the inserting block 140 and the groove 150 from departing from each other along the axial direction. Thus, movement of the inserting block along the axial direction can be limited. Furthermore, regarding the two second connection elements 15, the second side surface 152 of the groove 150 of one second connection element 15 is set face to the lateral ring 11, and the second side surface 152 of the groove 150 of another second connection element 15 is set face to the lateral ring 12. As such, along the axial direction of the cage, the two grooves 150 are adapted to limit movements of the two inserting blocks 140 from opposite directions, respectively. Two pairs of connection elements which are engaged can be stopped by each other along the axial direction, thus the pre-tighten effect of the cage along the axial direction is better. For example, when an axial force from the lateral ring 11 to the lateral ring 12 is imposed to the two first connection elements 14, the inserting block 140 close to the lateral ring 11 has a tendency of departing from the groove 150. However, the inserting block 140 close to the lateral ring 12 is stopped by the second side surface 152. Thus, the first connection elements 14 will not depart from the second connection elements 15. In some other embodiments, when the first transverse bar and the second transverse bar are both configured with more than two connection elements, the second side surface of the groove of at least one connection element and the second side surface of the groove of the other at least one connection element are configured to face to different lateral rings, respectively.

Keep referring to FIG. 4 and FIG. 5, the groove 150 further includes a first surface 153, wherein the first surface 153 is parallel to a central axis of the cage and is adapted to limit the inserting block 140 from moving along the radial direction of the cage. The inserting block 140 and the first surface 153 is adapted to stop each other along the radial direction of the cage, so as to prevent the inserting block 140 and the groove 150 from departing from each other along the radial direction of the cage. Therefore, movement of the inserting block 140 along the radial direction can be limited. In this embodiment, two first surfaces 153 of the two second connection elements 15 are configured to face to two opposite directions respectively, wherein the first surface 153 of one second connection element 15 faces to an inner side of the cage along the radial direction, while the first surface 153 of the other second connection element 15 faces to an outer side of the cage along the radial direction. As such, along the radial direction of the cage, the two grooves 150 are adapted to limit movements of the two inserting blocks 140 from opposite directions, respectively. Thus, two pairs of connection elements which are engaged can limit each other from moving along the radial direction of the cage, so as to prevent the first connection element 14 and the second connection element 15 which are engaged from departing from each other along the radial direction of the cage. For example, when a force towards the inner side of the cage along the radial direction is imposed to the two first connection elements 14, the inserting block 140 close to the lateral ring 11 has a tendency of departing from the groove 150. However, the inserting block 140 close to the later ring 12 is stopped by the first surface 153. Thus, both the first connection elements 14 will not depart from their corresponding second connection elements 15. In some other embodiments, when the first transverse bar and the second transverse bar are both configured with more than two first connection elements, the first surface of at least one groove and the first surface of the other at least one groove are configured to face to opposite directions, respectively.

Keep referring to FIG. 4, the first side surface 151 and the second side surface 152 are partially overlapped along the axial direction of the cage. In other words, projections of the first side surface 151 and the second side surface 152 on a plane perpendicular to the axial direction of the cage are partially overlapped. As such, the first side surface 151 not only can limit the inserting block 140 from moving along the circumferential direction, but also can limit the inserting block 140 from moving along the axial direction. Regarding the first connection element 14 and the second connection element 15, which face to each other along the circumferential direction, when a load along the axial direction is applied to the inserting block 140, the first side surface 151 and the second side surface 152 are adapted to stop the inserting block 140 from two opposite directions along the axial direction of the cage, so as to prevent the engaged connection elements from departing from each other along the axial direction.

Figure 6:
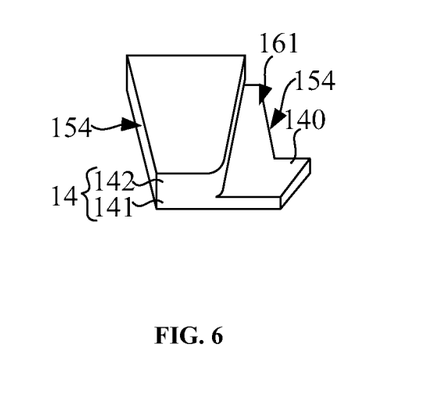
FIG. 6 schematically illustrates a perspective structure diagram of a first connection element of the K-type cage bearing in FIG. 4.
Figure 7:
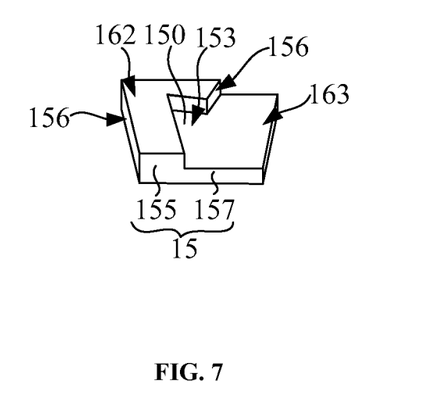
FIG. 7 schematically illustrates a perspective structure diagram of a second connection element of the K-type cage bearing in FIG. 4.

Referring to FIG. 6, the first connection element 14 includes a first plate-shaped body 141, wherein the first plate-shaped body 141 includes two first plate surfaces 161 facing to opposite directions along the radial direction of the cage and two third side surfaces 154 facing to opposite directions along the axial direction of the cage, and the inserting block 140 is located on one of the third side surfaces 154 of the first plate-shaped body 141 and protrudes along the axial direction of the cage. Referring to FIG. 7, the second connection element 15 includes a second plate-shaped body 155, wherein the second plate-shaped body 155 includes two second plate surfaces 162 facing to opposite directions along the radial direction of the cage and two forth side surfaces 156 facing to opposite directions along the axial direction of the cage, the groove 150 is located at one of the second plate surface 162 of the second-plate shaped body 155 and has an opening extending to one of the forth side surfaces 156 along the axial direction of the cage. The third side surface 154 where the inserting block 140 is located and the opening of the groove along the axial direction are configured to face to the lateral rings 11 and 12, respectively. As such, the inserting block 140 is adapted to be inserted into the groove 150 along the axial direction of the cage.

Furthermore, the first connection element 14 further includes a protruding part 142 located on one of the first plate surfaces 161. On the side where the opening of the groove extending along the axial direction of the cage is located, the second connection element 15 further includes an extended plate 157 extending from the fourth side surface 156 along the axial direction of the cage. The extended plate 157 has two third plate surfaces 163 facing to opposite directions along the radial direction of the cage, wherein one of the third plate surfaces 163 and the first surface 153 are configured on a common plane, and the other one of the third plate surfaces 163 is configured to be align with the second plate surface 162 of the second plate-shaped body 155 which is not configured with the groove. Regarding two connection elements facing each other along the circumferential direction of the cage, the first plate surface 161 where the protruding part 142 of the first connection element 14 is located and the first surface 153 of the groove 150 of the second connection element 15 are configured to face to two opposite directions, respectively. When the inserting block 140 is inserted into the groove 150, the third plate surface 163 of the extended plate 157, which is set on the common plane with the first surface 153, fits with the first plate surface 161 where the protruding part is located, wherein the extended plate 157 stand against the protruding part 142 along the axial direction of the cage. Accordingly, a contact surface of the two connection elements along the radial direction of the cage is enlarged, thus these two connection elements are adapted to well limit each other from moving along the radial direction of the cage. Furthermore, the extended plate 157 stands against the protruding part 142, thus the two connection elements, which face each other along the circumferential direction, are adapted to limit each other from moving along the axial direction of the cage.

Figure 8:
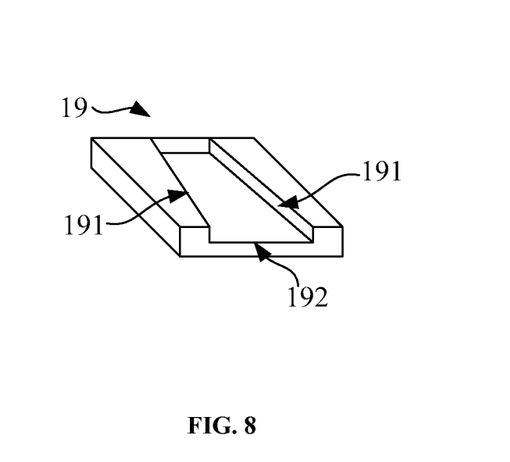
FIG. 8 schematically illustrates a perspective structure diagram of an inserting groove of the K-type cage bearing in FIG. 4.

Keep referring to FIG. 4, two ends of the first transverse bar 131 are respectively configured with an inserting element 18 and an inserting groove 19, and two ends of the second transverse bar 132 are also respectively configured with an inserting element 18 and an inserting groove 19, wherein the inserting element 10 on the first transverse bar 131 faces to the inserting groove 19 on the second transverse bar 132 along the circumferential direction, and the inserting element 18 on the second transverse bar 132 faces to the inserting groove on the first transverse bar 131 along the circumferential direction, and the inserting elements extends to the opening of the cage. Referring to FIG. 8, the inserting groove 19 has two side walls 191 facing each other along the axial direction of the cage, and a bottom surface 192 facing an inner side of the cage along the radial direction of the cage. The inserting groove 19 has an opening facing to the inserting element 18 along the circumferential direction, and the inserting element 18 is adapted to be inserted into the inserting groove 19 through the opening. As such, while the inserting block 140 is inserted into the groove 150, the inserting element 18 is inserted into the inserting groove 19 at the same time. When a load along the axial direction is applied to the cage, the inserting element 18 and the inserting groove 19 take precedence over all the connection elements of bearing the axial load. Thus, the inserting groove 19 and the inserting element 18 are adapted to protect the connection elements and prevent the connection elements from being damaged due to large load.

In addition, in some other embodiments, the first transverse bar and the second transverse bar can also be configured in the following way: the two ends of the first transverse bar are respectively configured with two inserting elements, and the two ends of the second transverse bar are respectively configured with two inserting grooves, wherein the inserting elements face to the inserting grooves along the circumferential direction in one to one manner, thus the inserting elements are adapted to match with the inserting grooves, respectively.

Figure 9:
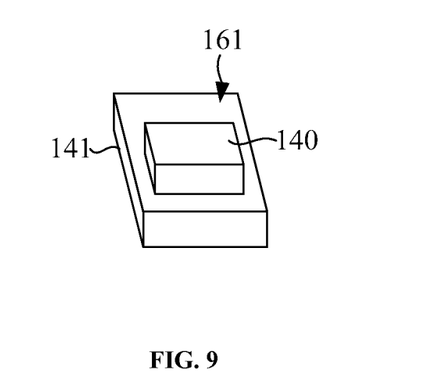
FIG. 9 schematically illustrates a connection element of a K-type cage bearing having an inserting block according to another embodiment of the present disclosure.
Figure 10:
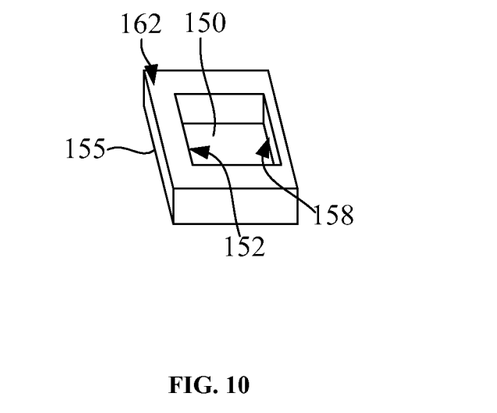
FIG. 10 schematically illustrates a connection element of a K-type cage bearing having a groove according to another embodiment of the present disclosure.

Referring to FIG. 9 and FIG. 10, another embodiment is illustrated. Regarding the two connection elements facing to each other along the circumferential direction, the inserting block 140 is located on one of the first plate surfaces 161 of the first plate-shaped body 141, and the groove 150 is located in the second plate surface 162 of the second plate-shaped body 155. The first plate surface 161 where the inserting block is located and the second plate surface 162 where the groove is located are configured to face to different sides of the cage along the radial direction. For example, the first plate surface 161 where the inserting block 140 is located is configured to face to an inner side of the cage along the radial direction, and the second plate surface 162 where the groove 150 is locate is configured to face to an outer side of the cage along the radial direction. As such, the inserting block 140 is adapted to be inserted into the groove 150 along the radial direction of the cage. In this embodiment, the groove 150 further includes a fifth side surface 158 facing to the second side surface 152 along the axial direction. Thus, along the axial direction, the second side surface 152 and the fifth side surface 158 are adapted to limit movement of the inserting block 140 from two opposite directions.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A K-type cage bearing comprising a cage which has an opening along a circumferential direction thereof, wherein the cage comprises:
   two coaxial lateral rings; and
   a plurality of transverse bars set between the two lateral rings and spaced along the circumferential direction, wherein two ends of each transverse bar are respectively connected with the two lateral rings, and among the plurality of transverse bars, those two of transverse bars located adjacent to the opening of the cage are respectively defined as a first transverse bar and a second transverse bar;
   wherein both the first transverse bar and the second transverse bar are configured with at least one connection element, all the connection elements extend from the first or second transverse bar into the opening of the cage, and the at least one connection element on the first transverse bar faces the at least one connection element on the second transverse bar along the circumferential direction in a one to one manner;
   wherein between two of the connection elements which face to each other along the circumferential direction, one of the connection elements is configured with an inserting block, while the other of the connection elements is configured with a groove, and the inserting block is adapted to be inserted into the groove; and
   wherein the groove comprises a first side surface and a second side surface, the first side surface faces, along the circumferential direction of the cage, toward a transverse bar of the first transverse bar and the second transverse bar to which the connection element configured with the groove is attached and is adapted to limit the inserting block from moving along the circumferential direction, and the second side surface faces to one of the lateral rings along an axial direction of the cage and is adapted to limit the inserting block from moving along the axial direction.

2. The K-type cage bearing according to claim 1, wherein both the first transverse bar and the second transverse bar are configured with two of the connection elements among which two of the connection elements are configured with the groove, the second side surface of the groove of one of the connection elements and the second side surface of the groove of the other of the connection elements are configured to face to the lateral rings, respectively.

3. The K-type cage bearing according to claim 1, wherein projections of the first side surface and the second side surface on a plane perpendicular to a central axis of the cage are partially overlapped.

4. The K-type cage bearing according to claim 2, wherein the groove further comprises a first surface which is parallel to a central axis of the cage and is adapted to limit the inserting block from moving along a radial direction.

5. The K-type cage bearing according to claim 4, wherein between two of the connection elements which are configured with the groove, the first surface of the groove of one connection element and the first surface of the groove of the other connection element are configured to face to opposite directions, respectively.

6. The K-type cage bearing according to claim 4, wherein the connection element which is configured with the inserting block is defined as a first one of the connection elements, and the connection element which is configured with the groove is defined as a second one of the connection elements;
   the first connection element comprises a first plate-shaped body, the first plate-shaped body has two first plate surfaces facing to opposite directions along the radial direction of the cage and two third side surfaces facing to opposite directions along the axial direction of the cage;
   the second connection element comprises a second plate-shaped body, the second plate-shaped body has two second plate surfaces facing to opposite directions along the radial direction of the cage and two fourth side surface facing to opposite directions along the axial direction of the cage; and
   the inserting block is located on one of the third side surfaces and protrudes along the axial direction of the cage, the groove is located in one of the second plate surfaces and has an opening extending to one of the fourth side surfaces along the axial direction of the cage, the third side surface where the inserting block is located and the opening of the groove extending along the axial direction face to the lateral rings respectively; or the inserting block is located on one of the first plate surfaces and protrudes along the radial direction of the cage, the groove is located in one of the second plate surfaces, and between the first plate surface where the inserting block is located and the second plate surface where the groove is located, one is configured to face to an inner side of the cage along the radial direction, and the other one is configured to face to an outer side of the cage along the radial direction.

7. The K-type cage bearing according to claim 6, wherein the inserting block is located on one of the third side surfaces and the groove is located in one of the second plate surfaces;

the first connection element further comprises a protruding part located on one of the first plate surfaces;

on a side where the opening of the groove extending along the axial direction is located, the second connection element further comprises an extended plate, the extended plate has two third plate surfaces facing to opposite directions along the radial direction of the cage, one of the third plate surfaces and the first surface are configured on a common plane; and between two of the connection elements facing to each other along the circumferential direction, the first plate surface where the protruding part of the first connection element is located and the first surface of the groove of the second connection element face to two opposite directions respectively, when the inserting block is inserted into the groove, the extended plate stands against the protruding part along the axial direction of the cage.

8. The K-type cage bearing according to claim 6, wherein the inserting block is located at one of the first plate surfaces, and the groove is located in one of the second plate surfaces; and the groove further has a fifth side surface facing to the second side surface along the axial direction.

9. The K-type cage bearing according to claim 1, wherein the first transverse bar is configured with inserting elements at two ends thereof, and the second transverse bar is configured with inserting grooves at two ends thereof; or the first transverse bar is configured with an inserting element and an inserting groove at two ends respectively, and the second transverse bar is configured with the inserting element and the inserting groove at two ends thereof respectively;

the inserting elements face to the inserting grooves along the circumferential direction of the cage in a one to one manner;

the inserting elements extend into the opening of the cage; and the inserting grooves have two side walls facing to each other along the axial direction of the cage, a bottom surface facing the inner side of the cage along the radial direction of the cage, and an opening facing the inserting element along the circumferential direction of the cage, wherein the inserting elements are adapted to be inserted into the inserting grooves through the openings of the inserting grooves.

* * * * *